Sept. 30, 1969    R. F. GERISCH    3,469,667
ARTICLE SPACING APPARATUS
Filed Oct. 5, 1967    5 Sheets-Sheet 5

Inventor
Rudolph F. Gerisch
by Hibben, Noyes & Bicknell
Atty's

Sept. 30, 1969      R. F. GERISCH      3,469,667

ARTICLE SPACING APPARATUS

Filed Oct. 5, 1967      5 Sheets-Sheet 4

United States Patent Office 3,469,667
Patented Sept. 30, 1969

3,469,667
ARTICLE SPACING APPARATUS
Rudolph F. Gerisch, 1317 Portsmouth Ave.,
Westchester, Ill. 60156
Continuation-in-part of application Ser. No. 499,421,
Oct. 21, 1965. This application Oct. 5, 1967, Ser.
No. 673,171
Int. Cl. B65g 11/00
U.S. Cl. 193—40                                29 Claims

ABSTRACT OF THE DISCLOSURE

Disclosed herein is an apparatus for maintaining a plurality of articles, such as hangers, in a spaced apart relationship on an elongated support while permitting sequential movement of the articles along the support. The articles are held in a spaced apart relationship by engagement with first end sections of pivotally mounted levers. Each lever is held against pivoting movement by engagement of a preceding or downstream articles with a second end section of the lever until a next adjacent downstream lever is released for pivoting movement by movement of a downstream article out of engagement with the next adjacent downstream lever.

---

This application is a continuation-in-part of my co-pending application Ser. No. 499,421, filed Oct. 21, 1965, now Patent No. 3,415,352, and entitled Transporting System and Method.

In dry cleaning and laundry plants, and clothing manufacturing and retailing plants, it is customary to transport garments on hangers from one location in the plant to another for the purpose of storing or shipping the garments, and numerous conveyor schemes have been devised for this purpose. In addition to transporting such articles from one location to another, it is also desirable in many cases to have some convenient temporary storing and spacing arrangement so that articles may be supported in a spaced apart relationship and sequentially released from storage. My invention utilizes a novel principle that makes it possible to transport articles in any desired sorted relation between a loading point and to space the articles apart from each other while maintaining the predetermined sorted relation of the articles at all times so that there is no possibility of error. Although the invention has particular utility in the dry cleaning and laundry fields, the principles may be employed wherever it is necessary to handle articles.

Therefore, it is an object of this invention to provide a novel and improved apparatus for spacing articles apart from each other while maintaining a predetermined sorted relation between these articles.

Another object of this invention is to provide an apparatus for temporarily storing articles in a spaced apart relationship and sequentially releasing the articles.

Another object of this invention is to provide an apparatus for maintaining a relatively large predetermined minimum space between a plurality of articles being moved along a support member.

Another object of this invention is to provide a novel and improved apparatus, of the foregoing character, which is especially adapted to handle articles suspended from hooks or the like.

Other objects and features of the invention will become more apparent upon a consideration of the following detailed description taken in connection with the accompanying drawings wherein.

Figures 1, 2, 4, 5, 6:
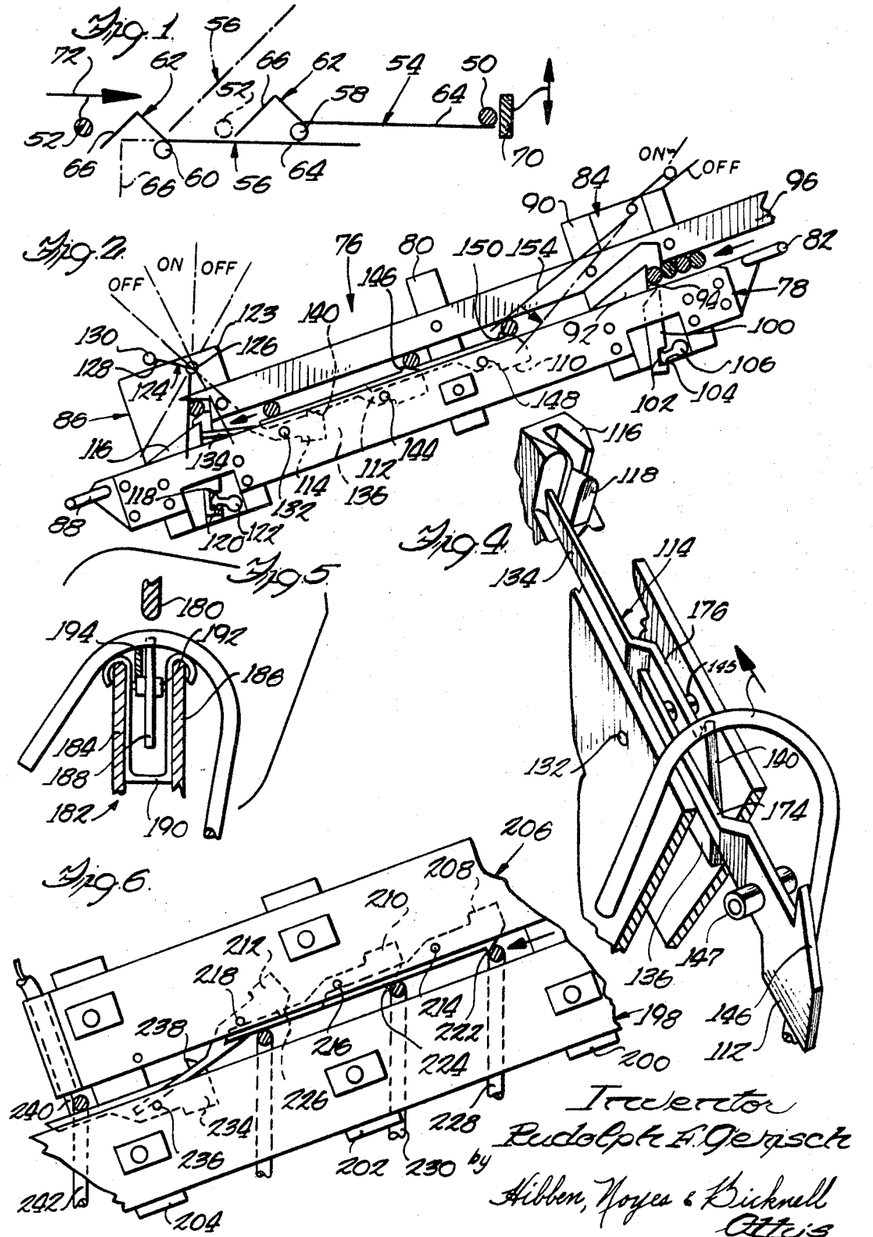
FIG. 1 is a schematic illustration showing the relationship between a plurality of levers and a plurality of articles which are maitnained in a spaced apart relationship by the levers in accordance with the present invention.
FIG. 2 is a schematic illustration of an embodiment of the invention wherein a support rail is utilized in connection with a plurality of pivotally mounted levers for providing a spaced apart relationship between a plurality of hangers.
FIG. 4 is an enlarged perspective view further illustrating the interrelationship between the pivotally mounted levers of the apparatus of FIG. 2 and a hanger hook.
FIG. 5 is an enlarged sectional view illustrating an embodiment of the invention wherein levers are pivotally mounted on brackets which are snapped onto support rails to space apart a plurality of articles such as hangers.
FIG. 6 is a schematic illustration of an embodiment of the invention, similar to FIG. 2, wherein levers are mounted above the conveyed or spaced apart articles.

Turing now to a more detailed consideration of the drawings, FIG. 1 is a schematic illustration in which a plurality of articles, indicated at 50 and 52, are maintained in a spaced apart relationship by a plurality of independently pivotal spacer levers 54 and 56. The levers 54 and 56 are pivotally mounted at a central or body section, as indicated at 58 and 60, for independent movement from a blocking position shown in solid lines in FIG. 1 to a release position, indicated in dashed lines in FIG. 1 for the lever 56. For purposes of clarity of illustration, the spacer levers 54 and 56 are shown in FIG. 1 with their pivotally mounted body sections 58 and 60 spaced vertically rather than in horizontal alignment. The levers 54 and 56 are substantially identical in structure and each of them has a first end or head section or portion 62 and a second end or tail section or portion 64 located on opposite sides of the pivot mounting for the lever. The first end section 62 includes an upwardly and downstream sloping cam or blocking surface 66 which is located in an overlapping or laterally adjacent relationship with the second end section 64 of a next upstream lever. The second end section 64 of each spacer lever is normally supported in the blocking position by a support member on which the next downstream spacer lever is pivotally mounted. In other words, the second end section 64 of each lever preferably extends downstream at least as far as the fulcrum or pivot point of the next adjacent downstream lever.

The article 50 is shown in abutting engagement with a stop member 70 and in engagement with the second end or tail section 64 of the lever 54. When the article 50 is in this position the article cannot move downstream, that is to the right as indicated by the arrow 72 in FIG. 1, until the stop member 70 is moved in an upwardly direction to enable the article 50 to continue its horizontal movement. It should be noted that when the article 50 is in this position the lever 54 cannot pivot at 58 from the blocking position to the release position since the article 50 engages the second end or tail section 64 of the lever 54 to prevent the lever from pivoting in a counterclockwise direction to the release position.

Horizontal movement of the article 52 in a downstream direction, from the position shown in solid lines in FIG. 1, moves the article 52 into engagement with the cam surface 66 to pivot the lever 56 to the release position, as indicated in dashed lines in FIG. 1. Further movement of the article 52 in a downstream direction moves the article past the pivot point 60 and out of engagement with the first end section 62 of the lever 56 to enable the lever to pivot back to the blocking position, as shown in solid lines in FIG. 1. Still further downstream movement of the article 52 brings the article into engagement with the first end section 62 of the lever 54, as shown in dashed lines in FIG. 1. The lever 54 blocks further movement of the article 52 in the downstream direction since the article 50 is in engagement with the second end section 64 of the lever 54 and holds the lever against pivoting to the release position.

When the stop member 70 is raised and the article 50 is moved out of engagement with the second end section 64 of the lever 54, the lever 54 is free to pivot to the release position and the article 52 then continues its downstream movement. After the article 52 has cleared an outer or downstream end of the lever 56, the lever 56 is released to enable a succeeding or upstream article to pivot the lever 56 to the release position and to enable the upstream article to assume the position shown in dashed lines for the article 52 while the article 52 proceeds downstream to the position shown in solid lines for the article 50.

The spacing between the articles when they are in engagement with the first end sections of the levers 54 and 56 can be varied by varying the lengths of the second end sections 64 of the levers and the spacing between the pivot points 58 and 60 for the levers. It should be noted that varying the amount of overlap between the second end section 64 of the lever 56 and the next downstream lever 54 varies the time between pivoting movement of the levers 54 and 56 from the blocking position to the release position. In addition to providing a predetermined spacing between the articles 50 and 52, the overlapping relationship between the first and second end sections of the levers 54 and 56 insures that a relatively small article is not located in a gap between the levers 54 and 56 where the small article would fail to engage the second end portion 64 of the lever 56 to hold the lever 56 in the blocking position. When small lightweight articles are being transported, the cam surfaces 66 will have a relatively small degree of slope with the path of movement of the articles to enable the levers to be pivoted upwardly with a minimum of force. Conversely, when relatively heavy articles are being transported, the slope of the cam surfaces 66 is increased to increase the force required to pivot the levers 54 and 56 upwardly.

In view of the foregoing remarks, it is apparent that a plurality of levers 54 and 56 maintain a predetermined minimum spacing between adjacent articles 50 and 52. An upstream lever, the lever 56, cannot pivot to the release position to allow an upstream article to continue its downstream movement until the next downstream lever, that is the lever 54, is free to pivot to the release position. When the article 50 has moved downstream out of engagement with the second end section 64 of the lever 54, the lever 54 is free to pivot to the release position and the article 52 can proceed in the downstream direction. When the article 52 has cleared the second end section 64 of the lever 56, the lever 56 is free to pivot to the release position and a next upstream article can move downstream to the position formerly occupied by the article 52. This spacing between articles prevents damage to the articles due to impact, contact or pressure as the articles are transported and during storage of the articles.

An apparatus 76 embodying the preceding schematically illustrated principle is shown in FIG. 2. The apparatus 76 includes a twin support rail structure 78 of the type described in considerable detail in the aforementioned application Ser. No. 499,421, now Patent No. 3,415,352. The rail structure 78 is supported by a frame 80 and is positioned at an inclined angle of, for example, ten to twenty degrees, which is sufficient to cause an article, such as a hanger hook, positioned on the rail structure 78 to slide downwardly from right to left as seen in FIG. 2. Of course, the rail structure need not be inclined when a suitable power drive is provided for moving hanger hooks along the rail structure. At the upper end of the rail structure 78 may be provided a rod 82, and hooks positioned thereon slide downwardly to the rail structure 78 and to an injector or loading unit 84. Further downstream along the rail structure 78 from the injector unit 84 is a second injector or release unit 86, and at the lower end of the rail structure 78 is a slick discharge rail 88. The structure shown in FIG. 2 may be provided, for example, to feed hangers one at a time to a hook insertion assembly of the type shown in the aforementioned application Ser. No. 499,421, now Patent No. 3,415,352.

The injector unit 84 comprises a frame 90 which supports a stop member 92, the latter member having a stop surface 94 formed thereon. The surface 94 extends upwardly between the twin rails of the structure 78 and is slanted rearwardly, or upstream, at a slight angle so that hangers positioned on the rail structure 78 above the injector unit 84 will slide downwardly and be caught by the stop surface 94. A top rail 96 is preferably positioned just above the rail structure 78 and generally parallel thereto, the lower edge of the top rail 96 being spaced above the upper edge of the rail structure 78 a distance slightly greater than the diameter of the stock from which the hangers are made. The main function of the top rail 96 is to prevent hangers from rising upwardly off of the rail structure 78 when a group of hangers are bunched at the stop member 92.

The hangers held by the surface 94 may be lifted over the stop member 92 by means of a lift bar 100 which is mounted for generally vertical movement on the stop member 92. At the lower end of the lift bar 100 is a cam follower surface 102 which receives a cam 104 secured to a pivotally mounted, laterally extending rod 106. Pivotal movement of the rod 106 in the clockwise direction, as seen in FIG. 2, causes upward movement of the cam 104 and consequently upward movement of the lift bar 100. The upper end of the lift bar 100 is slanted and engages the under side of the hanger which is against the surface 94, and the upward movement of the lift bar is sufficient to cause the hanger to be lifted over the upper corner of the surface 94. Both the upper edge of the lift bar 100 and the upper edge of the stop member 92 slant downwardly and downstream, and therefore a hanger lifted upwardly over the upper corner of the surface 94 immediately slides downwardly over the upper edge of the stop member 92 and along the upper edge of the twin rail structure 78.

Downstream from the injector unit 84 and mounted on the structure 78 are a series of spacer levers, three being shown in this case at 110, 112 and 114. The spacer levers, as will be explained in greater detail subsequently, function in the same manner as do the levers 54 and 56 of FIG. 1. At the lower end of the lowermost spacer lever 114 is the second injector unit 86 which also includes a stop member 116, a lift bar 118, and a cam member 120 secured to a pivotally mounted rod 122. The operation of the injector unit 86 is similar to the operation of the unit 84, and upward movement of the lift bar 118 causes a hanger positioned against the stop 116 to be moved upwardly and over the upper corner of the stop 116, after which it slides downwardly along the twin rail structure 78 to the discharge rail 88.

The injector unit 86 also includes a support 123 for the members 116, 118, and 122 and also for an actuator or trigger 124 for the injector unit 86. The actuator 124 includes a pivotally mounted rod 126 having secured thereto a right angle member 128, one end of the member 128 extending downwardly in front of the lift bar 118, and the other arm of the member 128 extending generally in the downstream direction and having a weight 130 secured to the end thereof. The pivotally mounted rod 122 is caused to rotate by means of a solenoid which is energized when the member 128 is pivoted to a proper position, as will be described hereinafter.

The spacer lever 114 is pivotally mounted on the rail structure 78 by means of a pin 132 through a body section of the lever. The pin 132 extends laterally with the spacer lever 114 being positioned between the twin rails of the structure 78. The spacer lever 114 includes an elongated second end or tail section 134 which extends downstream from the pivot pin 132 to a point adjacent the stop 116 and the lift bar 118 and a weighted first end or head section 136 upstream from the pivot pin 132 and having a stop 140 formed at its upper edge. When a hanger resting on the rail structure 78 is against the stop member 116, it also rests on the second or downstream end section 134 of the lever 114 and prevents the lever 114 from pivoting in the clockwise direction as seen in FIG. 2. The lever 114 is normally urged in the clockwise direction by its weight distribution. When the lever 114 is so held by a hanger, the stop 140 extends upwardly sufficiently far above the upper edge of the rail structure 78 in a blocking position to prevent a hanger from sliding along the rail structure 78 past the stop 140. However, once the lift bar 118 has moved upwardly and removed the hanger from the stop 116, the actuating lever 114 is permitted to pivot in the clockwise direction to a release position and the stop 140 lowers sufficiently to permit the hanger previously held by it to slide downwardly along the rail structure 78 to the stop 116. It will be seen, therefore, that the lever 114 serves to hold the hanger at the stop 140 until the preceding hanger has been lifted over the stop 116 by the lift bar 118.

Positioned upstream from the spacer lever 114 is the spacer lever 112 which has a construction similar to the lever 114. The second or downstream end of the lever 112 extends downstream in an overlapping relationship past the stop 140 and over the pivot pin 132. The lever 112 is also pivotally mounted by a pivot pin 144 and has a first end section or stop 146 which is constructed to prevent a hanger from moving past it when another hanger being held by the stop 140 over the downstream or second end of the lever 112.

The spacer lever 110 also has a construction similar to the levers 112 and 114, and it is pivotally mounted by means of a pivot pin 148 and it also includes a stop or first end section 150. The lower or downstream end section of the lever 110 extends downstream in an overlapping relationship past the stop 146 and rests on the pin 144. As will be described hereinafter, the spacer levers 110, 112, and 114 may be positioned in side-by-side relation between the twin rails of the rail structure 78, so that they do not interfere with each other.

Thus, it will be seen that the arrangement of spacer levers permits the articles to be held in any desired spaced relation for intermittent feeding to the lowermost injector 86 in the same manner explained in connection with FIG. 1. By varying the length of the spacer levers and distance between pivot pins, any desired spacing between successive articles can be maintained. In addition the spacer lever arrangement can be used separately and not in conjunction with the injector.

In the operation of the construction shown in FIG. 2, assume that a hanger is positioned on the rail structure 78 against the stop 116 of the second injector unit 86. The weight of the hanger over the downstream end of the lever 114 is sufficient to prevent pivotal movement of the lever 114 to a release position. Therefore, a second hanger positioned on the rail structure 78 will slide downstream until it meets the stop 140 on the first or head section of the lever 114 and will be thereafter held by the stop 140. The hanger being held by the stop 140 is also over the downstream end of the lever 112 and this hanger prevents pivotal movement in the clockwise direction of the lever 112 to the release position. Therefore, still another hanger inserted on the support rail structure 78 will slide downstream until it meets the stop 146 and will thereafter be held by the stop 146 since the lever 112 cannot pivot in the clockwise direction. The hanger being held by the stop 146 is also over the downstream end of the lever 110 and prevents the lever 110 from pivoting in the clockwise direction. Therefore, still another hanger inserted on the rail structure 78 will slide downstream until it engages the stop 150 of the lever 110 and will thereafter also be held.

The first or upstream injector unit 84 includes a switch actuator arm 154 which is positioned to be engaged by the hanger being held by the stop 150, and when a hanger is at the stop 150, the switch (not shown), which is actuated by the arm 154, is turned off. When there is not a hanger at the stop 150, the arm 154 is pivoted, as by means of a spring, to the dashed line position shown in FIG. 2 where it turns on the switch of the injector unit 84 and causes pivotal movement of the rod 106, which action, as previously explained, causes upward movement of the lift bar 100 thereby lifting a hanger over the stop 92 after which the hanger slides downwardly to the stop 150. The hanger then at the stop 150 holds the switch of the injector unit 84 in the off position until it is removed.

Actuation of the solenoid of the second injector or release unit 86 causes pivotal movement of the rod 122 and lifting of the hanger at the stop 116 upwardly and over the stop. As soon as the hanger at the stop 116 has been lifted upwardly, it releases the downstream end of the spacer lever 114 and permits the lever 114 to pivot slightly in the clockwise direction to the release position. Such pivotal movement of the lever 114 lowers the stop 140 and permits the hanger formerly held by the stop 140 to slide downwardly along the rail structure 78 to the stop 116. Movement of the hanger away from the stop 140 also permits subsequent pivotal movement, in the clockwise direction, of the spacer lever 112 and release of the hanger formerly held by the stop 146. A similar action then repeats for the hanger formerly held by the stop 150 of the lever 110. As previously explained, as soon as a hanger is released by the stop 150, the arm 154 is turned to actuate the switch of the injector unit 84 and inject the next succeeding hanger past the stop 92. Thus, after each actuation of the second injector unit 86, each hanger on the rail structure 78 moves downstream to engage the next adjacent downstream lever and is then held until a subsequent actuation of the injector unit 86.

The injector unit 86 may be actuated manually to cause a hanger to be dropped on the rail 88 when desired, or the injector unit 86 may be actuated by movement of a pusher fork past a trip mechanism of the type shown in the aforementioned application Serial No. 499,421. Still further, the injector unit 86 may be actuated by the arm 124 which causes hangers to be repeatedly inserted on the rail 88 as long as there are hangers on the support structure 78. In one mode of operation, the arm 124 is designed to turn the switch on when a hanger is being held by the stop 116 and to hold the switch turned on until the hanger has moved upwardly above the upper edge of the stop 116 by the lift bar 118. Once the hanger is above the upper edge of the stop 116, however, the switch is turned off until the hanger has cleared the stop 116 and is at the lower end of the rail structure 78. After the hanger has moved out from underneath the end of the arm 124, the switch arm 124 pivots in the counterclockwise direction as seen in FIG. 2 due to the weight 130, and the lower end of the arm 124 swings toward the right until it engages the next hanger sliding downwardly along the rail structure 78. As soon as the next subsequent hanger reaches the stop 116, the switch for the unit 86 is again turned on to raise that hanger upwardly for injection on the rail 88. Thus, the switch for the unit 86 will be alternately turned on and off as the hangers are moved along the slide rail 78 to the stop 116 and pushed over the upper edge of the stop 116 to the slide rail 88.

Although the injector device of FIG. 2 has been described in connection with an operation wherein one hanger at a time is fed by the injector units 84 and 86, it will be understood that by increasing the upper contact area of the lift bars 100 and 118, a plurality of hangers can be injected each time the injector units are actuated. Of course, if a plurality of hangers are injected at a time, the levers 110, 112 and 114 will enable a plurality of hangers to move sequentially in spaced apart groups along the rail structure 78.

Figure 3:
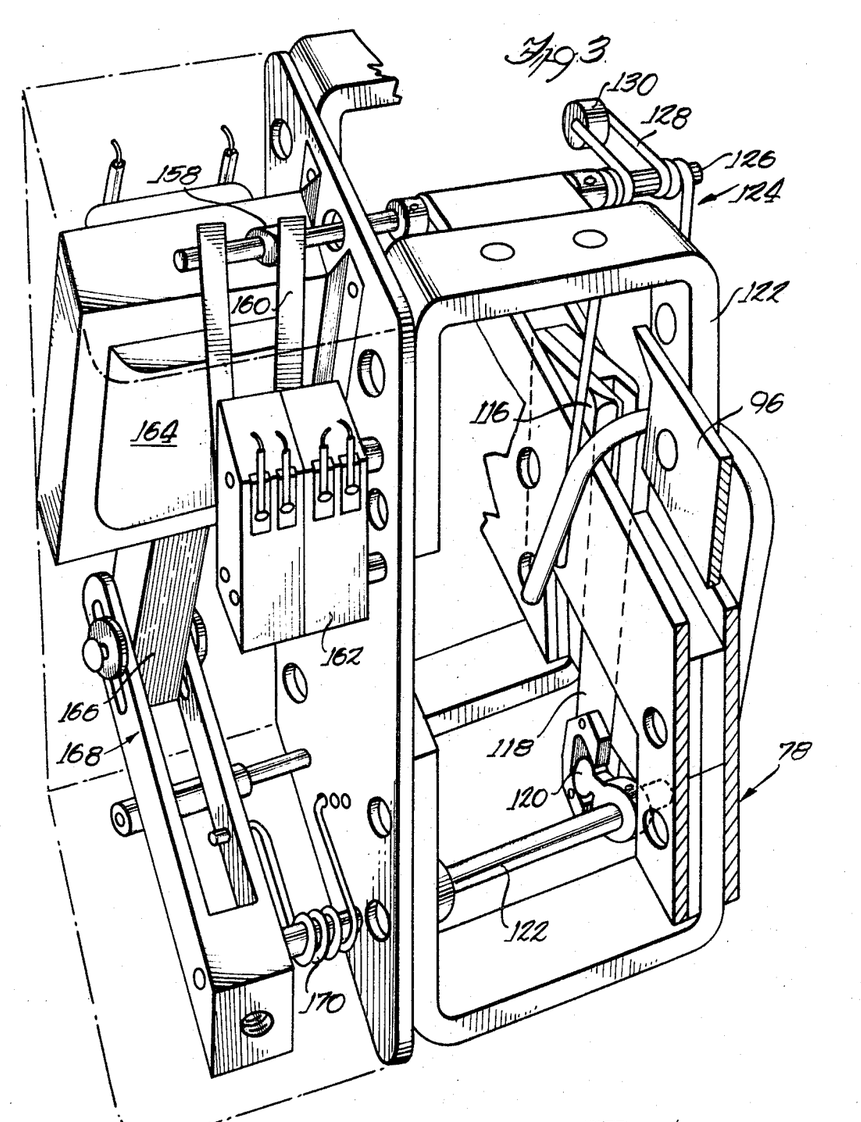
FIG. 3 is an enlarged perspective view of an injector or release assembly which is used with the apparatus of FIG. 2.

FIG. 3 shows in greater detail the structure of the injector unit 86 and a portion of the rail structure 78. The pin 126 which pivotally mounts the switch arm 124 has a cam 158 secured thereto which is positioned to engage an actuating arm 160 of a switch 162. The switch 162 is connected to control energization of a solenoid 164 which in turn has its vertically movable plunger 166 pivotally connected to a forked member 168 rigidly secured on the pivot rod 122. A torsion spring 170 is provided to urge the forked member 168 and the plunger 166 in the downward direction as seen in FIG. 3.

FIG. 4 shows in grereater detail the structure of the spacer levers 112 and 114. The downstream or second end 134 of the lever 114 is positioned laterally adjacent the lift bar 118 and between the twin rails of the structure 78. As previously explained, a hanger resting on the upper edges of the twin rail structure 78 and against the stop 116 will be over the downstream end 134 of the lever 114 and, therefore, will prevent the lever 114 from pivoting about the pin 132. Similarly, a hanger being held by the stop 140 of the lever 114 will be positioned over the downstream end of lever 112 and accordingly will prevent the lever 112 from pivoting about the axis of its pivot pin (not shown). As shown in FIG. 4 the levers 112 and 114 have offset laterally adjacent or overlapping portions 174 and 176, respectively, which permit the levers to extend in side-by-side overlapping relationship between the twin rails of the structure 78 without interference to form a continuous series of levers. As also seen in FIG. 4, the levers are rigidly mounted on sleeves which are rotatable on the pivot pins. Thus, the lever 114 is mounted on a sleeve 145 rotatable on the pin 132, and the lever 112 is mounted on a sleeve 147 rotatable on the pin 144.

FIG. 5 shows a modified form of the structure shown in FIGS. 3 and 4. The structure shown in FIG. 5 also includes a top rail 180 (similar to the rail 96) and a support rail structure 182 including twin rails 184 and 186. Instead of pinning the spacer levers directly to the rails 184 and 186, the lever 188, which may be similar to one of the levers 110, 112 nad 114, is pivotally mounted on a longitudinally extending U-shaped bracket 190 by means of a pin 192. The bracket 190 is fastened to the rails 184 and 186 by turning the upper edges of the bracket 190 outwardly and downwardly over the upper edges of the rails 184 and 186, the bracket 190 being positioned between the rails 184 and 186. In FIG. 5, a portion 194 of the next adjacent upstream spacer lever is also shown resting on the upper surface of the pin 192.

An advantage of the structure shown in FIG. 5 over that shown in FIGS. 3 and 4 is that it is a relatively easy matter to remove a spacer lever from the support rail structure for servicing or replacement. All that is necessary is to lift the U-shaped bracket 190 upwardly out of engagement with the rail structure 182.

FIG. 6 shows still another form of the injector apparatus wherein some of the spacer levers are mounted above the support rail for the hangers or supported articles. The structure shown in FIG. 6 includes a lower support rail structure 198 which may be a twin rail of the type previously described and is supported by a series of frames 200, 202, and 204. Mounted on the frames 200 to 204 and above the rail structure 198 is an upper rail structure 206 which may be similar in construction to the lower rail structure 198. A continuous series of three spacer levers 208, 210, and 212 are pivotally mounted by means of pins 214 to 218, respectively, on the upper rail structure 206 in longitudinally spaced relation, the levers 208 and 210 having extended portions which are positioned underneath the pins 216 and 218, respectively. Each of the spacer levers 208 to 212 also includes a first end section or stop portion 222 to 226, respectively, which extends downwardly below the lower edge of the upper rail structure 206.

Hangers 228 and 230 are shown adjacent the stops 222 and 224, respectively. It will be noted that the upper ends of the hangers 228 and 230 appear to be raised above the upper edge of the rail structure 198. This is due to the curvature of the hangers and the width of the rail structure 198. The center or uppermost portion of each hanger hook is disposed above the upper edge of the rail structure 198, and the uppermost portion of the hook is sufficiently high to be engaged and held by the stop portions 222 and 224 of the levers 208 and 210 in the positions shown.

The hanger 230 being held by the stop portion 224 of the lever 210 is also underneath the extended portion of the next upstream lever 208 and therefore prevents pivotal movement in the counterclockwise direction of the lever 208 about the pin 214. By preventing the lever 208 from pivoting in counterclockwise direction to a release position, the hanger 228 is held at the position shown by the stop portion 222 of the lever 208. However, once the lever 210 is permitted to pivot in the counterclockwise direction to a release position, the hanger 230 is no longer engaged and held or blocked by the stop portion 224 and its slides down the inclined rail structure 198. Once the hanger 230 clears the downstream end of the lever 208, the lever 208 is also permitted to pivot in the counterclockwise direction and thus release the hanger 228. The hanger 228 will slide only so far as the stop member 224, however, because the hanger 230 previously held by the stop portion 224 will then have moved downwardly beneath the downstream extension of the lever 210. If the hanger 230 is then held by the stop portion 226 of the next downstream lever 212, the hanger 230 will then be underneath the downstream extended portion of the lever 210 and will hold the lever 210 in the position shown. The hanger 228 will then be at the position formerly occupied by the preceding hanger 230 and will be held by the stop portion 224. Another hanger subsequently injected on the support structure 198 will then be held by the stop portion 222 of the lever 208.

Downstream from the levers 208 to 212 is a spacer lever 234, which has a construction similar to the levers 208 to 212, and which is mounted on a laterally extending pin 236 for pivotal movement on the lower rail structure 198. The lever 234 also includes a first section or stop portion 238 which extends upwardly above the upper edge of the lower rail structure 198 and into the space between the two rail structures 198 and 206. At the lower or downstream end of the lever 234 is a release point 240. The point 240 may be the end of a flexible wire of a Bowden wire, the sheath of which is secured to the downstream end of the upper rail structure 206. When the release point 240 is in the downward or unactuated position, it holds a hanger 242 at a position on the rail structure 198 where it is over the downstream end of the lever 234 and thus prevents pivotal movement, in the clockwise direction, of the lever 234 about the axis of the pin 236 to a release position. In the position of the lever 234 shown, the stop portion 238 is in a position to catch and hold or block a hanger sliding downwardly on the rail structure 198 toward the release point 240. When a hanger is so held by the stop portion 238, it holds the downstream extended portion of the lever 212 in an upwardly displaced position where the stop portion 226 of the lever 212 extends downwardly into the space between the two rail structures 198 and 206 and also holds a hanger.

Once the release point 240 is actuated to release the hanger 242, the hanger 242 slides downwardly along the rail structure 198. The lever 234 is then free to pivot in the clockwise direction thereby releasing a succeeding hanger previously held by the stop portion 238. Such a hanger then slides along the upper edge of the lower rail 198 and, assuming that the release point 240 has returned to the lowered position shown in FIG. 6, the hanger released by the stop portion 238 will be caught by the release point 240 and the lever 234 will again be held in the blocking position shown. However, in the period of time when the lever 234 was pivoted in the clockwise direction and the hanger previously held there was sliding downstream, the lever 212 will also have been permitted to pivot in the counterclockwise direction and permit the hanger previously held by the stop portion 226 to slide downstream to be engaged by the stop portion 238 of the lever 234 and held until the next actuation of the release point 240. Similarly, a hanger being held by the stop portion 226 prevents pivotal movement of the lever 210 in the counterclockwise direction so that the hanger 230 is prevented from moving downstream. However, as soon as the preceding hanger previously held by the stop portion 226 of the lever 212 moves downstream away from the downstream portion of the lever 210, the lever 210 is free to pivot in the counterclockwise direction and release the hanger 230. Similar operation is then effected for the lever 208 and the hanger 228. Thus, for each actuation of the release point 240 a hanger is permitted to slide downstream from the release point 240 along the lower support rail 198 and all of the hangers along the lower rail structure 198 will advance one position to engage the next downstream stop.

If there are no hangers being held by the levers 208 to 212 and lever 234 but the release point 240 is in the downward position shown, a hanger inserted onto the lower rail structure 198 will slide past the series of levers 208 to 212 in succession and also past the stop portion 238 of the lever 234 to the release point 240. The same movement of a hanger will also occur in the structure shown in FIG. 2, where a hanger will slide downstream along the rail structure 78 when there are no other hangers on the rail structure 78 to hold the spacer levers in positions where they will engage and retard downward movement of a subsequent hanger.

Figure 7:
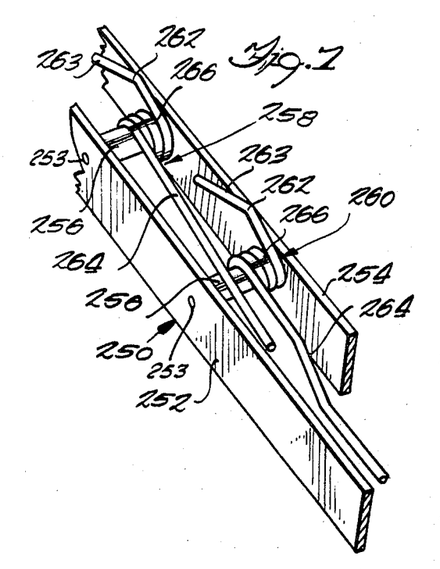
FIG. 7 illustrates a plurality of levers formed of wire and pivotally mounted about transverse members located between a pair of support rials.

In order to enhance the reader's understanding of the invention, a plurality of modified embodiments of the spacer or blocking levers are shown in FIGS. 7 through 21. It should be understood, of course, that the invention is not to be limited to the illustrated embodiments since these embodiments are set forth merely for purposes of clarification of the invention. Referring now to FIG. 7, a twin support rail structure 250, which is similar to the twin support rail structure 78 of FIG. 2, includes a pair of support rails 252 and 254 between which a plurality of support rungs or members 253 extend. A plurality of levers 258 and 260 are mounted in an overlapping relationship on bearing sleeves 256 which are rotatably mounted on the rungs 253 between the support rails 252 and 254. The levers 258 and 260 space apart articles supported by the rail structure 250 in much the same manner in which the pivotally mounted levers 110 through 114 of FIG. 2 space apart articles supported by the rail structure 78. The levers 258 and 260 are integrally formed of wire or rod and include a first or head end section 262 having a sloping cam surface 263 and a longitudinally extending second or tail end section 264. The first and second end sections 262 and 264 are interconnected by a body section 266. The body section 266 includes a plurality of coils which are tightly wrapped around the bearing sleeves 256 to fixedly connect the levers 258 and 260 to the bearing sleeves.

It will be apparent to those skilled in the art that the levers 258 and 260 function in much the same manner as previously explained in connection with the levers 54 and 56 of FIG. 1. Thus, when a first article engages the first end section 262 of the lever 258, the lever is pivoted in a counterclockwise direction, as viewed from the left in FIG. 7, to a release position by engagement of the article with the cam surface 263. The article can then move past the first end section 262 of the lever 258. The lever 258 then pivots back to the blocking position shown in FIG. 7 under either or both the influence of gravity and by engagement of the first article with the second end section 264 of the lever. The first article continues its downstream movement and engages the first end section 262 of the lever 260. If an article is not positioned in engagement with the second end section 264 of the lever 260, the lever 260 is also pivoted to a release position and the first article moves on downstream. If an article is positioned in engagement with the second end section 264 of the lever 260, the first article is blocked by the first end section 262 of the lever 260. Assuming that the first article is so blocked, the first article will engage the second end portion 264 of the lever 258 to hold the lever 258 against pivoting movement from the blocking position shown to the release position. The next succeeding or second article moving downstream is then blocked by the lever 258 which is held in the blocking position by engagement of the preceding or first article with the second end section 264 of the lever 258.

Continuing with reference to FIG. 7, in order for an article to move downstream past the levers 258 and 260, the article must pivot the levers 258 and 260 from the blocking positions shown to the release positions. When this pivoting movement occurs, the coils of the body section 266 are moved with the bearing sleeves 256 relative to the support rails 252 and 254. The bearing sleeves 256 are freely movable relative to the support rungs 253 extending between the support rails 252 and 254. However, the bearing sleeves could, if desired, be fitted for tight frictional engagement with the support rungs to provide frictional resistance to pivoting movement of the levers 258 and 260. This frictional resistance of the levers 258 and 260 causes the levers to impede the downstream motion of an article on the support rails 252 and 254. This frictional impediment to the downstream movement is particularly advantageous at locations wherein the articles are moved for a relatively long distance on the support rails 252 and 254 and could accelerate to a considerable speed and stop with a shock which in many instances would be quite objectionable. In addition, the rate of downstream movement can be varied by altering the slope of the cam surfaces 263 relative to the path of movement of the articles.

Figure 8:
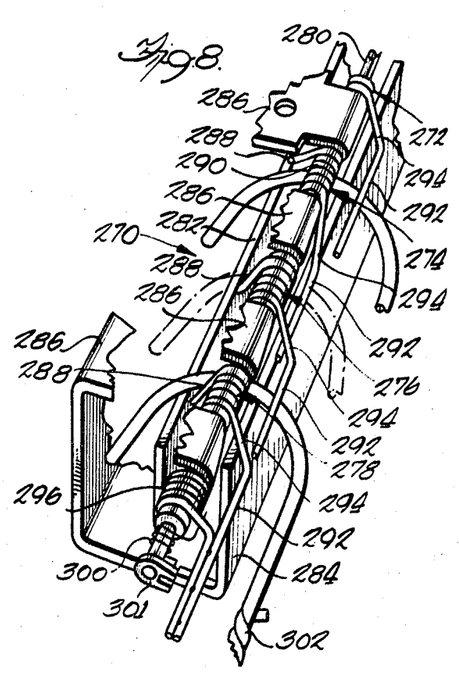
FIG. 8 illustrates an apparatus wherein a plurality of levers are mounted about a longitudinally extending axis to provide relatively large spacing between a plurality of articles, such as hangers.
Figures 9, 10:
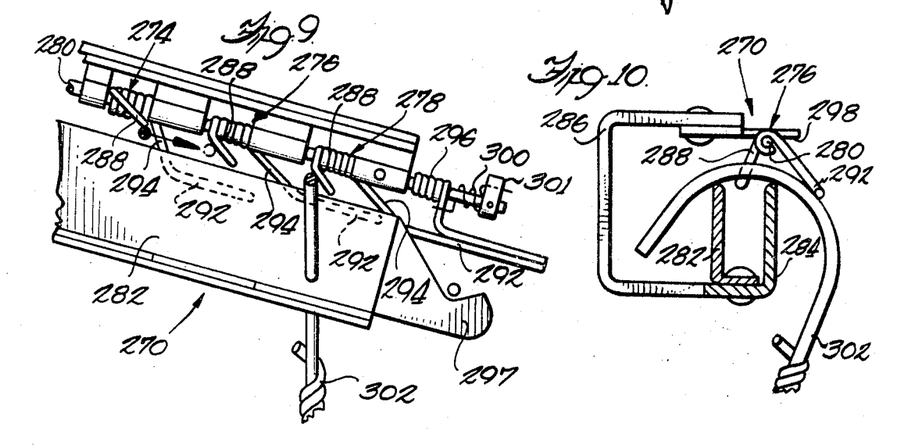
FIG. 9 is a side elevational view of the apparatus similar to the apparatus of FIG. 8, a hanger support or discharge hook being shown in FIG. 9 in association with the apparatus of FIG. 8.
FIG. 10 is a cross-sectional view of the apparatus similar to that of FIG. 8.

FIGS. 8, 9, and 10 illustrate an apparatus 270 wherein a series of levers 272 through 278 are pivotally mounted in an overlapping relationship on a longitudinally extending fixedly mounted support shaft 280 which is held above and in an offset parallel relationship with a pair of support rails 282 and 284 by a series of brackets 286. The spacer levers 272 through 276 are substantially identical in structure and include a head or first end section 288 which slopes or slants downwstream and is connected by a body section 290 to a relatively long, longitudinally extending second end or tail section 292. The second end section 292 is considerably heavier than the first end section 288 and pivots the levers 272 through 276 to a release position. The levers 272 through 276 are pivoted to a blocking position by engagement of an article with a sloping cam portion 294 of the second end section 292. The levers 272 through 276 are each integrally formed from a single piece of wire having the coiled body section 290 which engages the support rod 280. It should be noted that the second end sections 292 of the levers 272 through 276 extend into an overlapping or laterally adjacent relationship with the first end section 288 of the next downstream lever to form a continuous series of levers. The last lever 278 includes a first end section 288 and an elongated second end section 292 which is rigidly affixed to a pivotally mounted auxiliary support section 296. A hanger support or discharge hook 297 is shown in FIG. 9 for receiving hangers or other articles.

A hanger or other article moving downstream passes the raised first end portion 288 of the lever 274 which is in the release position. The hanger moves into engagement with the cam surface 294 of the second end portion 292 of the lever 274 and pivots the lever 274 to the blocking position, as illustrated for the lever 276 in FIGS. 9 and 10. A stop section 298 (FIG. 10) of a bracket 286 limits the upward pivoting movement of the lever 276. The next downstream lever 276 is held in the blocking position by engagement of a hanger 302 with the second end section 292 of the lever 276. Consequently, a hanger engaging the first end section 288 of the lever 276 is blocked or held against continued downstream movement (as shown in dashed lines in FIGS. 8 and 9). A hanger having its downstream movement blocked by the lever 276 also holds the second section 292 of the lever 274 outwardly to move the lever 274 from the release position shown in FIGS. 8 and 9 to a blocking position, as shown for the lever 276.

The lever 278 is normally urged toward the blocking position by a spring 300 mounted on a downstream end portion of the support rod 280. The spring 300 coacts between the auxiliary support section 296 and a retainer 301 secured on the shaft 280 to hold the spacer lever 278 in a blocking position until the second end section 292 of the lever is pivoted manually or otherwise in a clockwise direction, as viewed from the downstream end of the apparatus 270. Clockwise pivoting movement of the second section 288 of the lever 278 out of engagement with the hanger 302 to enable the hanger 302 to proceed in a downstream direction and clear the support rails 282 and 284 and engage the support hook 297 of FIG. 9. When the second end section 292 of the lever 278 is released, the lever 278 is pivoted back to the blocking position by the spring 300 to hold the next succeeding hanger on the support rails 282 and 284. It should be noted that only one hanger can be released at a time since the lever 278 must be pivoted back to the blocking position, by the action of the spring 300 and also by engagement of the hanger 302 with the second end section 292 of the lever 278, before the hanger 302 clears the second end section 292 of the lever 276 to release the lever 276 for pivoting movement.

The rate of movement of hangers or other articles along the support rails 282 and 284 can be altered by changing any one or a combination of a plurality of variable including the slope of the first end sections 288 and the cam portions 294 of the second end sections 292 of the levers, the slope of the support rails, the weight of the levers, the amount of offset of the support shaft 280 relative to the a central longitudinal axis of the support rails 282 and 284, the amount of friction between the body sections 290 and the support shaft 280, and the length of the second end sections 292 of the levers. By changing the slope of the first end sections 288 and the slope of the cam portions 294 of the levers relative to the path of movement of the articles or hangers, the amount of force required to pivot the levers upwardly can be varied since the upward component of the force exerted against the first end sections 288 and cam portions 294 will vary as an indirect function of their slope relative to the path of movement of the hangers. Thus, the greater slope of the first end sections 288 and the cam portion 294, the smaller the upward component of a given force and the greater the force required to pivot the levers relative to the support shaft 280. Of course, the greater the slope of the support rails 282 and 284 the greater is the influence of gravity on the hangers and the force applied against the levers by the hangers. The greater the weight of the levers the larger is the force which must be exerted to pivot the levers upwardly. Varying the amount of offset of the support shaft 280 relative to the central longitudinal axis of the support rails 282 and 284 varies the amount of leverage, or the length of the lever arms, which upward forces on the first end sections 288 and cam portions 294 have relative to the pivot shaft 280. The friction force between the body section 290 and support shaft 280 can be varied by loosening or tightening coils of the body sections on the support shaft. Finally, the greater the length of the second end sections 292 of the levers, the greater is the length of time required for a hanger moving at a given rate to clear the second end sections and to thereby enable the levers to pivot from the blocking position to the release position.

In view of the preceding remarks, it can be seen that the slope of the support rails, the structure of the levers 274 through 278, and the position of the levers relative to the support rails can be varied to change the rate of movement of a hanger or other article along the support rails. These variables in any given installation should be combined in such a way as to enable the lightest article to both pivot the levers relative to the support shaft and move downstream at a desired rate under the influence of gravity. At the same time, the combination of variable should also be such as to retard the downstream movement of a heavy article to thereby reduce impact loading on both the levers and the articles. Of course, if the articles are moved along the support rails by a suitable power drive, rather than by gravity, the combination of the aforementioned variables is not as critical.

It is contemplated that the lever structure shown in FIGS. 8 through 10 will be used at locations wherein a relatively large spacing is desired between the hangers or other articles. The levers 272 through 278 are particularly adapted for spacing hangers or other articles a relatively large distance apart since the levers pivot about a longitudinally extending axis and can have a second end portion 292 of any desired length. When the hangers are to be spaced apart for exceedingly large distances, auxiliary support members, similar to the support member 296, can be mounted on the support rods 280 and connected to the second end sections 292. It is also contemplated that spring assemblies, similar to the spring assembly 300, will be used with the levers 274 and 276 to hold the levers in either the release or the blocking position.

Figures 11, 12, 13:
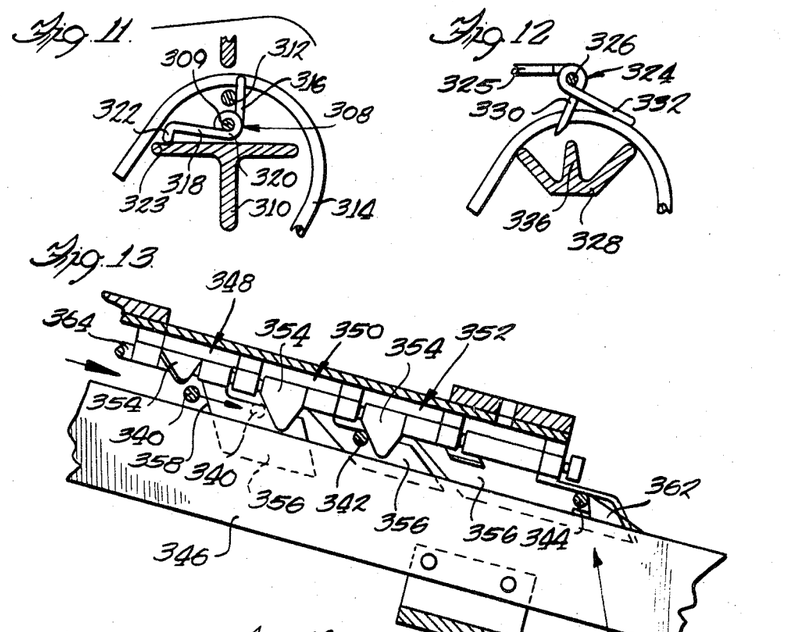
FIG. 11 is a cross-sectional view, similar to FIG. 10, illustrating another embodiment of the invention wherein hangers are supported on a fixedly mounted rod which is located above a plurality of pivotally mounted levers formed of wire.
FIG. 12 is a sectional viel, similar to FIG. 10, of an embodiment of the invention wherein a support rail is provided with a center section for limiting transverse pivotal movement of the levers relative to the support rail.
FIG. 13 is a side leevational view, similar to FIG. 9, of an embodiment of the invention wherein plate members are pivoted about a longitudinal axis to space apart a plurality of articles.

In the embodiment of the invention set forth in FIG. 11, a spacer lever 308 is pivotally mounted on a shaft 309 which is fixedly connected to a support rail 310. A support rod 312 is fixedly mounted above the spacer lever 308 for engagement with a hanger 314 to support the hanger. The spacer lever 308 includes a downstream sloping first end portion 316 and a second end portion 318 which are interconnected by a coiled body portion 320. As the hanger 314 continues its downstream movement, from the position shown in FIG. 11, it engages the first end portion 316 of the spacer lever 308 to pivot the spacer lever in a clockwise direction from the blocking position shown to a release position. A stop member 321 is provided to limit the clockwise pivoting movement of the lever 308. Continued movement of the hanger 314 in a downstream direction brings the hanger into engagement with a downstream sloping cam surface of the second end portion 318 of the lever 308. The force of the hanger against the cam surface of the second end portion 318 and the weight of the second end portion 318 cause the lever 308 to pivot back to the blocking position shown in FIG. 11. An outwardly projecting end 322 of the lever 308 rests against an upper surface 323 of the support rail 310 when the lever 308 is in the blocking position. Of course, the lever 308 is held in the blocking position by engagement of a hook end of the hanger 314 with the second end portion 318 of the lever 308.

In the embodiment of the invention set forth in FIG. 12, a spacer lever 324 is pivotally mounted on a longitudinally extending support member 326 which is mounted by a bracket 325 above a support rail 328. The spacer lever 324 is substantially similar in structure to the spacer levers 274 and 276 of FIGS. 8 through 10 and includes a first end section 330 and a second end section 332 which are interconnected by a coiled body section. The spacer lever 324 is pivoted from the blocking position shown in FIG. 12 to a release position by the weight of the relatively heavy second end section 332 of the spacer lever 324. Subsequent engagement of the hanger hook with the second end section 332 of the spacer lever 324 pivots the spacer lever from the release position to the blocking position to stop the movement of the next succeeding upstream hanger. Of course, when a hanger hook is moved out of engagement with the second end portion 332 of the spacer lever 324, the spacer lever is free to pivot under the influence of gravity from the blocking position to the release position. It should be noted that the support rail 328 includes an upwardly extending center portion 336 which is engaged by the second end section 332 of the spacer lever 324 to limit the clockwise pivoting movement of the spacer lever 324 when moving from the blocking position to the release position.

In the embodiment of the invention shown in FIG. 13 a plurality of plates are used as spacer levers to keep a plurality of hangers 340 through 344 in a spaced apart relationship as the hangers are moved along a support rail 346. The spacer levers, indicated at 348, 350 and 352, are mounted in an overlapping relationship and include a first end section 354 which is fixedly connected to a second end section 356. The second end section 356 is heavier than the first end section 354 and holds the first end section 354 up in a release position, as shown for the lever 348 of FIG. 13. Consequently, the hanger 340 can move freely past the first end section 354 of the lever 348. Continued downstream movement of the hanger 340 brings the hanger into engagement with a cam surface 358 on the second end section 356 of the spacer lever 348 to pivot the spacer lever 348 to a blocking position, as shown in FIG. 13 for the spacer lever 350. The spacer lever 350 is held in the blocking position by engagement of the hanger 342 with the second end section 356 of the spacer lever 350. Operation of an injector or release assembly 360 enables the hanger 344 to be moved over an uppermost edge of a stop block 362 to continue its downstream movement to a delivery rail. When the hanger 344 is released, the hangers 340 and 342 continue their downstream movement into engagement with the next preceding spacer lever. It should be noted that the spacer levers 348 through 352 are wrapped around a longitudinally extended support bar 364 for pivoting movement and function in the same general manner previously explained in connection wtih the spacer levers 274 and 276 and the support bar 280 of FIGS. 8 through 10.

Figures 14, 15:
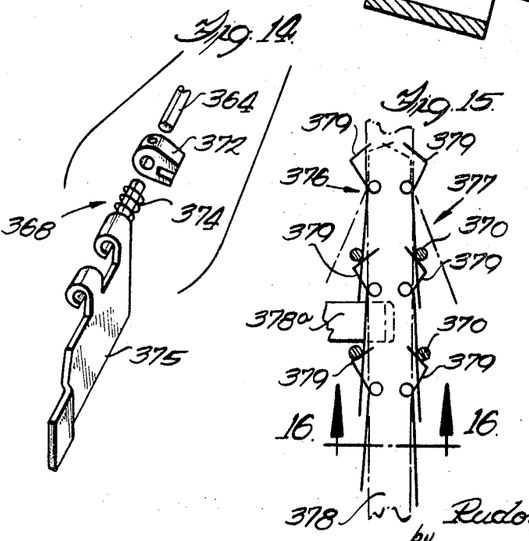
FIG. 14 is a perspective view of an extension for a plate member of FIG. 13, illustrating the use of a spring means to urge the plate member and extension into engagement with a hanger or other article.
FIG. 15 is a schematic illustration of an embodiment of the invention wherein a plurality of series of levers are mounted on opposite sides of a support member to space apart articles.

In FIG. 14 an extension assembly 368 is shown for engaging a second end portion of a spacer lever similar to the spacer levers 348 through 352 of FIG. 13. The extension assembly 368 includes a mounting bracket 372 which is fixedly mounted on the support rod 364 and a spring 374 which extends from the mounting bracket 372 to the extension plate 375. The spring 374 pivots the extension plate 375, and a second end section 356 of a spacer lever to which the extension plate is connected, into a position to engage a hanger which is blocked by a preceding spacer lever. The extension assembly 368 causes the spacer lever to resist movement from the release position to the blocking position and causes the second end section 356 and the extension plate 375 to resiliently engage the hanger to frictionally impede the downstream movement of the hanger. As was previously mentioned, this impeding of the downstream movement is particularly desirable for use in structures having a relatively long inclined rail in order to limit the acceleration of a hanger or other article as it moves a downstream direction under the influence of gravity. Of course, the extension assembly 368 will be used with the spacer levers 348 through 352 particularly when a relatively large spacing is desired between adjacent hangers or articles. The spring 374 can be reversed, if desired, to support the extension plate 375 in installations where the extension plate provides too great an impediment to the movement of hangers or other articles.

Figure 16:
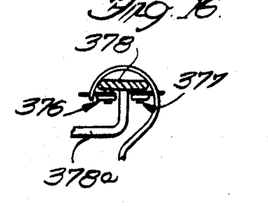
FIG. 16 is a schematic elevational sectional view, taken along a line 16—16 of FIG. 15, illustrating the relationship of the series of levers to a hanger hook.

Turning now to a consideration of FIGS. 15 and 16, a pair of series of spacer levers, indicated at 376 and 377, are shown mounted on opposite sides of a support rail 378 mounted on a bracket 378a. The series of spacer levers 376 and 377 are formed by overlapping spacer levers 379 which are substantially the same in structure as the spacer levers 358 and 360 of FIG. 7. However, the spacer levers 379 are mounted for pivoting movement about vertically extending axes rather than horizontally extending axes, as are the spacer levers 358 and 360 of FIG. 7. When an article moves into engagement with a pair of opposite spacer levers 379, the spacer levers are pivoted from a blocking position shown in solid lines in FIG. 15 to a release position shown in dashed lines in FIG. 15. If an article, such as a hanger (see FIG. 16), is in engagement with a downstream or second end section of the spacer levers 379, the spacer levers are retained in the blocking position in the manner previously explained.

Figures 17, 18, 19:
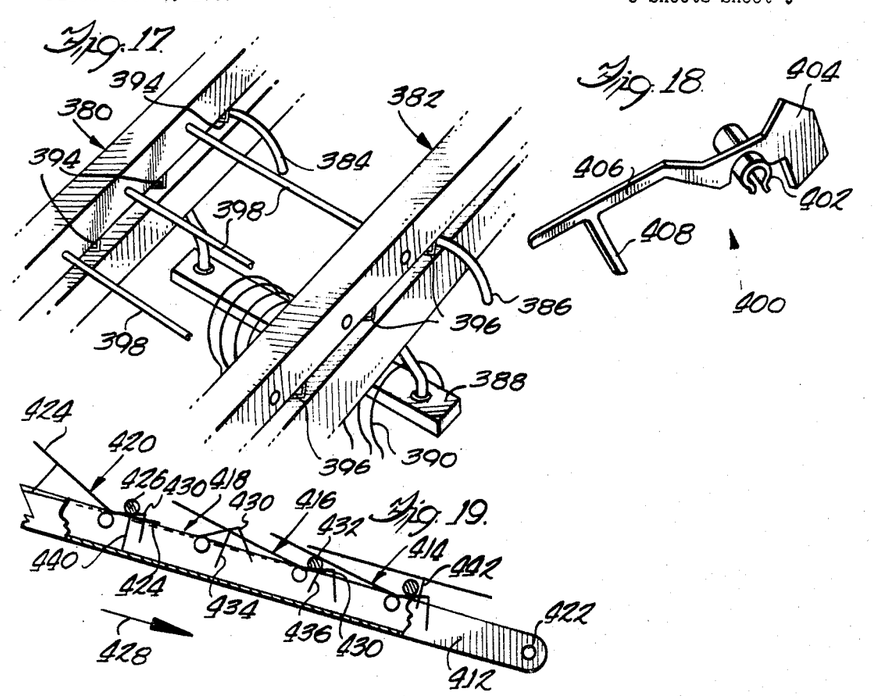
FIG. 17 is a perspective view of an embodiment of the invention wherein a plurality of separate support rails are used in connection with a plurality of separately mounted series of pivotal levers for spacing apart articles having end portions engaging the support rails.
FIG. 18 is an enlarged perspective view of a modified embodiment of the spacer lever.
FIG. 19 is a schematic elevational illustration of a pivotally mounted support rail in a loading position in which hangers are moved into supporting engagement with the support rail, the hangers being maintained in a spaced apart relationship by levers similar to the lever of FIG. 18.

In the embodiment of the invention shown in FIG. 17, a pair of support rail assemblies 380 and 382 are shown for supporting an article comprising a hanger assembly having a first end portion or hook 384 for engaging the support rail assembly 380 and a second end portion or hook 386 for engaging the support rail assembly 382. The end portions 384 and 386 are interconnected by a transversely extending bar 388 upon which a plurality of hangers 390 are supported. A series of spacer levers 394 and 396, similar in structure to the space levers 208 to 212 of FIG. 6, are mounted in each of the rail assemblies 380 and 382, respectively. However, each spacer lever 394 of the rail assembly 380 is connected to a corresponding spacer lever 396 of the rail assembly 382 by a transversely extending pivotally mounted rod 398.

The rod 398 fixedly interconnects the spacer levers 394 and 396 so that both of the spacer levers pivot from the blocking position, shown in FIG. 17, to the release position at the same time. This contemporaneous pivoting movement of the levers 394 and 396 releases both end portions 384 and 386 of an article for coordinated movement in a downstream direction. Of course, spacer levers similar to the spacer levers 274 and 276 of FIGS. 8 through 10 can also be used with the rail assemblies 380 and 382. If spacer levers of the type shown in FIGS. 8 through 10 are used, the oppositely disposed spacer levers would be interconnected by transversely extending bars mounted for transverse movement rather than for rotation as is the rod 398.

A modified spacer lever 400 is shown in FIG. 18. The spacer lever 400 includes a resilient mounting bracket or clip 402 which can be readily snapped onto a transversely extending support member, similar to the support members 256 of FIG. 7. The spacer lever 400 includes a first or head end section 404 and a second or tail end section 406. It will be apparent to those skilled in the art that the structure of the spacer lever 400 is substantially the same as the structure of the spacer levers 110 through 114 of FIG. 2. However, the spacer lever 400 includes a transversely outwardly extending stop section 408 which is integrally formed with the second end section 406. The stop section 408 enables the spacer lever 400 to be used for spacing apart articles as they are loaded onto a pivotally mounted support member 412, as shown in FIG. 19.

Continuing with reference to FIG. 19, spacer levers 414, 416, 418 and 420 are pivotally mounted on the support member 412. The spacer levers 414 through 420 are generally similar in structure to the spacer lever 400 of FIG. 18. The support member 412 is shown in a loading position inclined downwardly toward a pivot pin 422 for the support member or rail 412. When the support rail 412 is in the loading position shown in FIG. 19, the spacer levers 414 through 420 are pivoted to a loading position shown for the spacer lever 418 with a second end section 424 of the lever 418 extending substantially parallel with an upper edge of the rail 412. As a hanger or other artcle, indicated at 426 in FIG. 19, moves downstream in the direction of the arrow 428 toward the pivot pin 422 to load the support rail 412, the hanger engages a head section or first end portion 430 of the lever 420 and pivots the lever 420 from the loading position indicated in dashed lines to a blocking position indicated in solid lines in FIG. 19. The hanger 426 moves past the second section 424 of the lever 418 toward a head section 430 of the lever 418. A hanger 432 is in engagement with the head section 430 of the spacer lever 416 to hold the second end section of the spacer lever 416 upwardly away from the upper edge of the support rail 412. Consequently, as downstream movement of the hanger 426 continues the hanger 426 engages the first or head section 430 of the spacer lever 418 and moves into engagement with a stop section 434 of the spacer lever 416 in much the same manner in which the hanger 432 engages a stop section 436 of the spacer lever 414. Engagement of the hangers 426 and 432 with the stop sections 434 and 436, respectively, blocks the downstream movement of the hangers. It should be noted that once the hanger 426 moves into engagement with the stop section 434 of the spacer lever 416, the spacer lever 418 is pivoted upwardly by engagement of the hanger 426 with the head section 430 of the spacer lever 418 to position a stop section 440 of the spacer lever 418 for blocking engagement with a succeeding hanger. A primary stop member 442 is mounted adjacent to the head section of the spacer lever 414 to stop the first hanger which is loaded onto the support rail 412.

Figures 20, 21, 22:
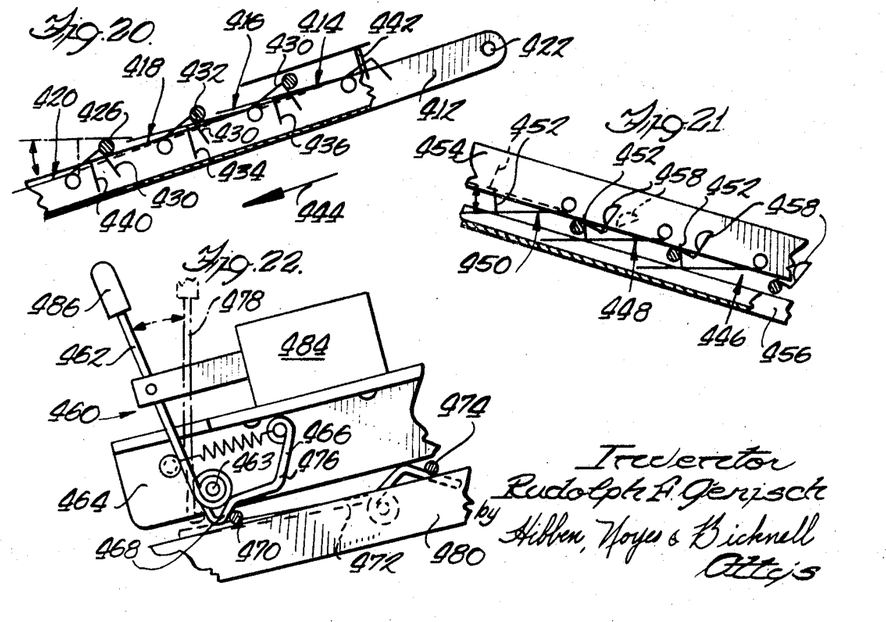
FIG. 20 is a schematic elevational illustration of the rail assembly of FIG. 19 in an unloading position wherein the hangers are held in a spaced apart relationship by the pivotally mounted levers for sequential unloading from the rail assembly.
FIG. 21 is a schematic elevational illustration, similar to FIG. 19, of an embodiment of the invention wherein the levers are pivotally mounted above the support rail for the hangers.
FIG. 22 is an elevational view of a hanger release or injector unit for use with the apparatus illustrated in the preceding figures.

When the support rail 412 is pivoted downwardly, to an unloading position, as shown in FIG. 20, the hangers 426 and 432 slide downstream in the direction of the arrow 444 away from the pivot pin 422 under the influence of gravity and into engagement with a head section 430 of a next downstream spacer lever. Thus, when the support rail is moved from the loading position to the unloading position, the direction of flow of the hangers reverses and the hanger 432 moves out of engagement with the head section 430 of the spacer lever 416 and into engagement with the head section of the spacer lever 418 as shown in FIG. 20. Similarly, the hanger 426 moves out of engagement with the head section of the spacer lever 418 into engagement with the head section of the spacer lever 420.

A release or injector device is provided at the outermost end of the rail 412 opposite the pivot 422 to release the hangers one at a time from the rail 412. When a preceding hanger is released from the rail 412 the succeeding hangers move downstream one position by pivoting the spacer levers from the blocking position shown in solid lines in FIG. 20 to the release position, shown in dashed lines in FIG. 20 for the spacer lever 418. It should be noted that the stop sections 434 and 436 of the spacer levers are ineffective when the support rail is in the unloading position shown in FIG. 20. Thus, by using a modified form of the spacer lever, that is a form similar to the one shown in FIG. 18, the spacer levers can be used for retaining articles in a spaced apart relationship during a loading of a support rail and during an unloading of the articles from the support rail. It is contemplated that this embodiment of the invention will be particularly useful at locations where it is desired to store articles in a spaced apart relationship in a relatively small amount of space and then to sequentially discharge the articles one at a time from storage.

A modified embodiment of the storage rail assembly of FIGS. 19 and 20 is shown in FIG. 21. In the embodiment of the invention set forth in FIG. 21, spacer levers 446, 448 and 450 having stop sections 452 are pivotally mounted on an upper rail 454 above a hanger support rail 456. Head sections 458 of the spacer levers 446 through 450 include counterweights which tend to pivot the spacer levers 446 through 450 about a central transversely extending axis to locate a second or tail section of the spacer levers in alignment with a lower edge of the upper rail 454 (as shown in dashed lines in FIG. 21). As hangers are positioned or loaded on the support rail 456, the hangers pivot the head or first end sections of the spacer levers upwardly to a blocking position, as shown in solid lines in FIG. 21. Of course, when the rails 454 and 456 are pivoted to a downwardly inclined position, the hangers are moved downwardly into engagement with the head section of the next downstream spacer lever in much the same manner as explained in connection with FIG. 20. The hangers can then be sequentially released from the support rail assembly.

A hook injector or release assembly 460 is shown in FIG. 22. The hook release assembly 460, while being considerably different in its structure and method of operation, performs the same function as does the injector assembly 86 of FIG. 2. The hook release assembly 460 includes an upwardly extending actuator or release lever 462 which is pivotally mounted at 463 on an upper support or guard rail 464 overlying an article support rail 480. An article holding section 466 extends outwardly from the release lever 462. The article holding section 466 includes a first or primary stop section 468 which is engaged by a downstream hanger 470. The downstream hanger 470 retains a spacer lever 472 in a blocking position to hold an upstream hanger 474 in a spaced apart relationship with the downstream hanger 472. A second or secondary stop section 476 is also provided on the article holding section 466 of the release lever.

When the release lever 462 is pivoted in a clockwise direction, to the position shown in dashed lines at 478 in FIG. 22, the primary stop section 468 is moved upwardly to enable the hanger 470 to be discharged downwardly along the support rail 480, and the secondary stop section 476 is projected downwardly into the path of the succeeding hanger 474. The spacer lever 472 is then free for pivoting movement from the blocking position shown to the release position. The hanger 474 will continue its downstream movement past the head section of the lever 472 to engage the stop section 476 of the release lever until the release lever 462 is pivoted back to the normal position shown in solid lines in FIG. 22. When the release lever is pivoted back to the normal position shown in solid lines in FIG. 22, the stop section 468 will block further downstream movement of the hanger 474. Thus, by the use of a pair of stop sections 468 and 476, the release lever allows only one hanger to be discharged at a time. The release lever can be moved from the normal position to a release or discharge position by a solenoid 484 or by a handle 485 mounted on an outer end of the actuator lever 462.

In view of the foregoing remarks it is believed that the structure and method of operation of my invention will be apparent to those skilled in the art. However, it should be noted that my invention contemplates the use of a plurality of pivotally mounted spacer or stop levers for maintaining a spaced apart relationship between a plurality of articles. The articles are held against downstream movement by engagement with first or head sections of the spacer levers until a preceding or first article is moved out of engagement with a spacer lever. Then an upstream spacer lever is pivoted from a blocking position to a release position and the succeeding or second article moves downstream into engagement with the spacer lever. In this manner a plurality of articles can be stored in a spaced apart relationship and discharged from storage one at a time while maintaining a predetermined sorting of the articles. When a relatively large distance is to be maintained between the articles, it is contemplated that the spacer levers will be pivoted about a longitudinally extending axis which is generally parallel to a path of movement of the articles. However, when a relatively small or short spacing is to be maintained between articles, it is contemplated that spacer levers pivoted about transverse axes may be used to hold the articles in a spaced apart relationship.

While many different embodiments of the spacer levers have been illustrated, the spacer levers each include a first end or head section having a sloping cam surface which is engaged by an article when the spacer lever is in a blocking position. Each spacer lever also includes a second or tail end section which is engaged by an article to hold the spacer lever against pivoting movement from the blocking position to the release position. When an article is moved out of engagement with the second end section of a spacer lever which is furthest downstream, the upstream spacer levers are sequentially pivoted from the blocking position to the release position to enable the succeeding articles to proceed one step down the series of spacer levers. In order to provide this sequential, stepping, spaced apart movement of the articles, the second end section of an upstream spacer lever is positioned laterally adjacent to a first end section of a next downstream spacer lever to form a continuous series of overlapping spacer levers. Each spacer lever transmits the weight of an article directly to the support rails and thereby prevents a buildup of pressure on the furthest downstream articles.

While my invention has been illustrated in connection with supporting hangers in a dry cleaning or laundry environment, the spacing device can be used for many other purposes such as spacing articles apart to allow for air circulation to dry paint or other coatings, to position articles in a spaced apart relationship for inspection, treatment or coating, etc. It is also contemplated that the spacer assembly can be used as a flexible line storage point between variable supply and demand stations with both curved and straight support rails. In addition, it is contemplated that the spacer assembly will be used by those skilled in the art for many other applications wherein automatic spacing of articles with a sequential discharge of the articles is required. Therefore, while particular embodiments of the invention have been shown, it should be understood that the invention is not limited thereto since many other modifications are possible, and it is contemplated to cover by the appended claims any such modifications as fall within the true spirit and scope of the invention.

What is claimed is:

1. Apparatus for supporting and permitting sequential movement of articles in a spaced apart relationship, said apparatus comprising: an elongated article support; and a plurality of stop levers pivotally mounted along said support at longitudinally spaced apart locations, each of said stop levers being pivotally movable between a stop position and a release position and having first and second end sections, the first end section of each of said stop levers being laterally adjacent and overlapping the second end section of a next adjacent upstream stop lever, the first end section of each of said stop levers having a stop portion adapted to engage an upstream article on said support and to prevent the upstream article from moving along said support when the stop lever is in its stop position, each of said stop levers being adapted to be held in its stop position by engagement of a downstream article with the second end section of the stop lever when the downstream article is being held by the first end section of the next adjacent downstream stop lever, and each of said stop levers being movable to its release position for releasing the upstream article when the downstream article has been released and has moved out of engagement with the second end section of the stop lever, whereby, as a result of said overlapping, both large and small articles, can be handled while insuring that a relatively small article is not located in a gap between adjacent levers.

2. Apparatus as set forth in claim 1 wherein: said support comprises an upper rail structure and a lower structure, at least one of said stop levers being pivotally mounted on said lower rail structure and the remainder of said stop levers being pivotally mounted on said upper rail structure, said lower rail structure comprising said article support.

3. Apparatus as set forth in claim 1 further including: an article release device mounted on said support adjacent to a second end section of a furthest downstream stop lever, said release device including a stop surface projecting above the level of said support and adapted to hold an article in engagement with said second end section of said furthest downstream stop lever to hold said furthest downstream stop lever against pivoting movement from the stop position to the release position, and lift means adapted to be moved upwardly and engage an article being held by said stop surface and move said article upwardly over the edge of said stop surface to thereby release said furthest downstream stop lever for movement from the stop position to the release position to enable succeeding articles to move downstream.

4. Apparatus as set forth in claim 1 wherein: each of said stop levers is mounted for pivoting movement along an axis extending substantially parallel to a longitudinal axis of said support.

5. Apparatus as set forth in claim 1 wherein: each of said stop levers is mounted for pivotal movement about an axis extending transversely to a path of movement of the articles.

6. Apparatus as set forth in claim 1 wherein: each of said stop levers is formed from a single piece of metal rod having a body portion mounted for pivoting movement along an axis extending substantially parallel to a longitudinal axis of said support.

7. Apparatus as set forth in claim 1 wherein: each of said stop levers is formed from a single piece of wire having a body portion mounted for pivoting movement about an axis extending transversely to said support.

8. Apparatus for holding a plurality of articles in a spaced apart relationship, said apparatus comprising: a plurality of levers having first and second end sections, each lever of said plurality of levers being mounted with the second end section being laterally adjacent and extending into at least a partially overlapping relationship with the first end section of a next adjacent downstream lever to form a continuous series of levers, each lever of said plurality of levers being independently pivotal relative to the next downstream lever to enable an article of the plurality of articles to move past the first end section of a lever into engagement with the first end section of a next downstream lever and each lever of said plurality of levers being adapted to be held against pivotal movement relative to the next downstream lever by engagement of an article of the plurality of articles with the second end section of the lever to block movement of an upstream article of the plurality of articles past the first end section of the lever to hold the articles in a spaced apart relationship, whereby, as a result of said overlapping relationship, both large and small articles can be handled while insuring that a relatively small article is not located in a gap between adjacent levers.

9. Apparatus as set forth in claim 8 wherein: said apparatus is movable to a loading position wherein each lever of said plurality of levers is independently pivotal relative to a next upstream lever by engagement of an article of the plurality of articles with the first end section of the lever to enable the article to move past the first end section of the lever, and each lever of said plurality of levers being adapted to be held against pivotal movement relative to the next downstream lever when the first section of the lever is engaged by an article to thereby block movement of a next upstream article past the second end section of the lever by engagement with the second end section of the lever to hold the articles in a spaced apart relationship when said apparatus is in the loading position.

10. Apparatus as set forth in claim 9 wherein: the second end section of each lever of said plurality of levers includes an outwardly projecting stop section for engaging articles when said apparatus is in the loading position.

11. Apparatus as set forth in claim 8 further including: spring means for resiliently holding said levers against pivotal movement to retard motion of the articles relative to said levers.

12. Apparatus as set forth in claim 8 wherein: said plurality of levers are mounted for pivotal movement on a longitudinal member extending generally parallel to a path of movement of the articles relative to said levers.

13. Apparatus as set forth in claim 12 wherein: each lever of said plurality of levers includes a body section wrapped around said longitudinal member and the second end section of each lever is elongated and includes an article engaging surface which extends in a generally parallel relationship with said longitudinal member to hold the lever against pivotal movement while an article is moved for substantial longitudinal distance in engagement with the second end section of the lever.

14. Apparatus as set forth in claim 13 wherein: the second end section of each lever of said plurality of levers is at least partially formed from a plate extending transversely outwardly from said longitudinal member.

15. Apparatus as set forth in claim 13 wherein: the second end section of each lever of said plurality of levers is at least partially formed by a rod extending for a portion of its length in a generally parallel relationship with said longitudinal member.

16. Apparatus as set forth in claim 8 further including: article release means mounted adjacent to a downstream end of said plurality of levers for controlling movement of the plurality of articles in a downstream direction relative to said levers, said article release means being operable to enable a first downstream article of the plurality of articles to move out of engagement with a second end section of a lever of said plurality of levers which is furthest downstream to sequentially release upstream levers of said plurality of levers for pivoting movement to enable succeeding articles of the plurality of articles to sequentially move in a downstream direction into engagement with next adjacent downstream levers of said plurality of levers.

17. Apparatus as set forth in claim 16 wherein: said article release assembly includes a pivotally mounted member having a first stop surface for holding a furthest downstream article of the plurality of articles against movement relative to the second end section of the furthest downstream lever, said pivotally mounted member further including a second stop surface for holding a next succeeding article of the plurality of articles against movement relative to the second end section of the furthest downstream lever after the furthest downstream article has been released for movement out of engagement with the furthest downstream lever to thereby enable only a single article at a time to move out of engagement with the furthest downstream lever each time the release is operated.

18. Apparatus as set forth in claim 17 wherein: said release assembly includes solenoid means connected to said pivotally mounted member for electrically operating said pivotally mounted member to release the furthest downstream of article of said plurality of articles and handle means connected to said pivotally mounted member for manually operating said pivotally mounted member to release the furthest downstream article of said plurality of articles.

19. Apparatus as set forth in claim 16 wherein: said article release assembly includes a stop section which is selectively pivotal from a first position blocking downstream movement of said first downstream article to a second position releasing said first downstream article for movement in a downstream direction, and a spring means connected to said stop section for resiliently urging said stop section into said first position.

20. Apparatus as set forth in claim 8 further including: a release device mounted adjacent to the second end section of the furthest downstream lever of said plurality of levers, said release device including an upwardly projecting stop surface for holdinng a furthest downstream article of the plurality of articles against movement relative to the furthest downstream lever and lift means adapted to be moved upwardly to engage the furthest downstream article to move the furthest downstream article to an upper edge of said stop surface.

21. Apparatus as set forth in claim 8 wherein: said plurality of levers are mounted on a member which supports said plurality of articles.

22. Apparatus as set forth in claim 8 wherein: said plurality of levers are mounted on a first member extending generally parallel to and spaced apart from a second member which supports said plurality of articles.

23. Apparatus as set forth in claim 8 wherein: at least one of said plurality of levers is mounted on a first member which supports said plurality of articles, the remainder of said plurality of levers being mounted on a second member which is spaced apart from and extends generally parallel to said first member.

24. Apparatus as set forth in claim 8 wherein: said plurality of levers are mounted on a plurality of brackets connected to a longitudinally extending article supporting member.

25. Apparatus as set forth in claim 8 wherein: a first end section of each lever of said plurality of said levers includes a cam surface which is inclined to a path of movement of the articles relative to said plurality of levers, said cam surface being engaged by an article of said plurality of articles to pivot the lever relative to the next adjacent lever.

26. Apparatus for supporting and permitting sequential movement of articles in a spaced apart relationship, said apparatus comprising: support means for supporting the articles; first and second spaced apart, substantially parallel, longitudinally extending series of levers mounted adjacent to said support means, each of said levers being pivotally movable between a stop position and a release position and having first and second end sections, the first end section of each of said levers being laterally adjacent and overlapping the second end section of a next adjacent upstream lever, the levers of said first series of levers being aligned with the levers of said second series of levers to enable both said first and said second series of levers to engage and position the articles, connector means extending between aligned levers of said first and second series of levers for coordinating movement of the aligned levers from their stop position to their release position, the first end sections of aligned levers of said first and second series of levers having stop portions adapted to engage an upstream article on said support means and to prevent the upstream article from moving along said support means when the aligned levers are in their stop positions, said aligned levers being adapted to be held in their stop positions by engagement of a downstream article with the second end sections of said aligned levers when the downstream article is being held by the first end sections of the next adjacent aligned downstream levers, and said aligned levers being adapted to move to their release positions for releasing the upstream article when the downstream article has been released and has moved out of engagement with the second end sections of said aligned stop levers, whereby as a result of said overlapping, both large and small articles can be handled while insuring that a relatively small article is not located in a gap between adjacent levers.

27. Apparatus as set forth in claim 26, wherrein said first and second series of levers are mounted above said support means for coaction with articles moving along said support means.

28. Apparatus as set forth in claim 1 further characterized in that the second end section of each lever extends downstream at least as far as the pivot point of the next adjacent downstream lever.

29. Apparatus as set forth in claim 1 further characterized in that said stop portion of the first end section of each lever includes a sloping cam surface which is disposed in overlapping relationship with the second end section of the next adjacent upstream lever.

References Cited

UNITED STATES PATENTS

| 1,841,926 | 1/1932 | Zuehl | 221—75 |
| 1,819,032 | 8/1931 | Lehman | 193—40 |
| 2,297,330 | 9/1942 | Schoepfer | 193—32 |
| 2,644,564 | 7/1953 | Bassoff | 193—40 |

FOREIGN PATENTS 1,140,865  12/1962  Germany.

ANDRES H. NIELSEN, Primary Examiner